(12) United States Patent
Mule' et al.

(10) Patent No.: US 6,807,352 B2
(45) Date of Patent: *Oct. 19, 2004

(54) OPTICAL WAVEGUIDES WITH EMBEDDED AIR-GAP CLADDING LAYER AND METHODS OF FABRICATION THEREOF

(75) Inventors: Tony Mule', Atlanta, GA (US); James D. Meindl, Marietta, GA (US); Thomas K. Gaylord, Atlanta, GA (US); Elias N. Glytsis, Dunwoody, GA (US); Paul Kohl, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 117 days.

This patent is subject to a terminal disclaimer.

(21) Appl. No.: 10/074,067

(22) Filed: Feb. 11, 2002

(65) Prior Publication Data

US 2002/0122648 A1 Sep. 5, 2002

Related U.S. Application Data

(60) Provisional application No. 60/268,142, filed on Feb. 11, 2001.

(51) Int. Cl.[7] .................................................. G02B 6/10
(52) U.S. Cl. ....................................... 385/131; 385/132
(58) Field of Search .............................. 385/14, 15, 37, 385/39, 125, 129–132

(56) References Cited

U.S. PATENT DOCUMENTS

| | | | | |
|---|---|---|---|---|
| 3,950,073 A | * | 4/1976 | Horiguchi et al. ........... 385/123 |
| 4,959,540 A | | 9/1990 | Fan et al. ............... 250/227.12 |
| 5,250,816 A | | 10/1993 | Kitamura ...................... 257/81 |
| 5,293,626 A | | 3/1994 | Priest et al. ................. 713/401 |
| 5,416,861 A | | 5/1995 | Koh et al. ...................... 385/14 |
| 5,430,567 A | | 7/1995 | Shaw et al. .................. 359/107 |
| 5,434,524 A | | 7/1995 | Shaw et al. .................. 327/187 |
| 5,434,935 A | * | 7/1995 | Kragl ............................ 385/14 |
| 5,508,835 A | | 4/1996 | Takahashi et al. ........... 359/140 |
| 5,515,194 A | | 5/1996 | Kanterakis et al. ......... 359/127 |
| 5,677,778 A | | 10/1997 | Kanterakis et al. ......... 359/127 |
| 5,708,671 A | | 1/1998 | Siao et al. ..................... 372/20 |
| 5,737,458 A | * | 4/1998 | Wojnarowski et al. ........ 385/15 |
| 5,812,708 A | | 9/1998 | Rao .............................. 385/14 |
| 5,889,903 A | | 3/1999 | Rao .............................. 385/14 |
| 6,008,918 A | | 12/1999 | Kanterakis et al. ......... 359/117 |
| 6,125,217 A | | 9/2000 | Paniccia et al. ............... 385/14 |
| 6,285,813 B1 | | 9/2001 | Schultz et al. ................ 385/37 |
| 6,493,497 B1 | * | 12/2002 | Ramdani et al. ............ 385/131 |
| 6,621,972 B2 | * | 9/2003 | Kimerling et al. .......... 385/132 |
| 2002/0076188 A1 | * | 6/2002 | Kimerling et al. .......... 385/132 |
| 2002/0136481 A1 | * | 9/2002 | Mule' et al. .................. 385/14 |

OTHER PUBLICATIONS

Anthony R. Blythe and John R. Vinson; Polymeric Materials for Devices in Optical Fibre Systems; Sep. 1, 1999; Polym. Adv. Technol. 11, 601–611 (2000).

Thomas K. Gaylord and M. G. Moharam; Analysis and Applications of Optical Diffraction by Gratings; May, 1985; Proceedings of the IEEE, vol. 3, No. 5, May 1985; pp. 894–937.

* cited by examiner

*Primary Examiner*—Edward J. Glick
*Assistant Examiner*—Thomas R Artman
(74) *Attorney, Agent, or Firm*—Thomas, Kayden, Horstemeyer & Risley, LLP (57) ABSTRACT

Waveguides having air-gap cladding layers and methods of fabricating waveguides having air-gap cladding layers are disclosed. A representative waveguide includes a waveguide core having an air-gap cladding layer engaging a portion of the waveguide core. In addition, a representative method of fabricating a waveguide having an air-gap cladding layer includes: providing a substrate having a lower cladding layer disposed on the substrate; disposing a waveguide core on a portion of the lower cladding layer; disposing a sacrificial layer onto at least one portion of the lower cladding layer and the waveguide core; disposing an overcoat layer onto the lower cladding layer and the sacrificial layer; and removing the sacrificial layer to define an air-gap cladding layer within the overcoat polymer layer and engaging a portion of the waveguide core.

15 Claims, 6 Drawing Sheets

FIG. 3A
A-A SECTION

FIG. 2B

FIG. 3B
A-A SECTION

FIG. 2C

FIG. 3C
A-A SECTION

FIG. 2D

FIG. 3D
A-A SECTION

FIG. 2E

FIG. 3E
A-A SECTION

FIG. 2F

FIG. 3F
A-A SECTION

FIG. 2G

FIG. 3G
A-A SECTION

FIG. 2H

FIG. 3H
A-A SECTION

FIG. 6A
A-A SECTION

FIG. 5B

FIG. 6B
A-A SECTION

FIG. 5C

FIG. 6C
A-A SECTION

FIG. 5D

FIG. 6D
A-A SECTION

FIG. 5E

FIG. 6E
A-A SECTION

FIG. 5F

FIG. 6F
A-A SECTION

FIG. 5G

FIG. 6G
A-A SECTION

FIG. 5H

FIG. 6H
A-A SECTION

OPTICAL WAVEGUIDES WITH EMBEDDED AIR-GAP CLADDING LAYER AND METHODS OF FABRICATION THEREOF

CROSS-REFERENCE TO RELATED APPLICATION

This application claims priority to co-pending U.S. provisional application entitled, "Guided-wave Optical Interconnection Using Volume Grating Coupler and Air Gap Technologies Embedded Within A Microelectronic Package," having ser. No. 60/268,142, filed Feb. 11, 2001, which is entirely incorporated herein by reference.

This application is related to copending U.S. utility patent application entitled "Guided-wave Optical Interconnections Embedded Within a Microelectronic Package," filed on Feb. 11, 2002, which is entirely incorporated herein by reference.

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of MDA 972-99-1-0002 awarded by the DARPA of the U.S. Government.

TECHNICAL FIELD

The present invention is generally related to guided-wave devices and, more particularly, high index contrast waveguides and methods for preparing high index contrast waveguides.

BACKGROUND OF THE INVENTION

In general, waveguides are transmission paths adapted to direct the propagation of electromagnetic waves (e.g., light) in a longitudinal direction, while confining those electromagnetic waves within a certain cross section. A waveguide is defined, in its simplest form, as a set of two or more materials consisting of a region of high refractive index (referred to hereafter as the core region) surrounded by a region or regions of lower refractive index (referred to hereafter as the cladding region(s)).

In this regard, the selection of waveguide core and cladding materials is limited to those materials where the refractive index of the waveguide cladding material exhibits a lower refractive index than the waveguide core material. Proper selection of materials can increase the contrast in the refractive index between the waveguide core and the waveguide cladding. Two key advantages to a high index contrast waveguide technology include decreased bending loss along bent waveguide paths and reduced cross-talk between adjacent waveguides. Lower bending loss allows for more efficient optical power budgets, while reduced crosstalk enables higher interconnect density and reduced optical power splitter dimensions.

Thus, a heretofore unaddressed need exists in industries employing optical waveguide technology to address the aforementioned deficiencies and/or inadequacies.

SUMMARY OF THE INVENTION

Briefly described, the present invention provides for waveguides. A representative waveguide includes a waveguide core having an air-gap cladding layer engaging a portion of the waveguide core.

The present invention also involves a method of fabricating waveguides. A representative method includes: providing a substrate having a lower cladding layer disposed on the substrate; disposing a waveguide core on a portion of the lower cladding layer; disposing a sacrificial layer onto at least one portion of the lower cladding layer and the waveguide core; disposing an overcoat layer onto the lower cladding layer and the sacrificial layer; and removing the sacrificial layer to define an air-gap cladding layer within the overcoat polymer layer and engaging a portion of the waveguide core.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 1A–1B are schematics that illustrate two cross-sectional views of waveguide 100.

FIGS. 2A–2H are cross-section views of the fabrication process relative to the view illustrated in FIG. 1A, while

FIGS. 4A–4B are schematics that illustrate two cross-sectional views of waveguide 300.

FIGS. 5A–5H are cross-section views of the fabrication process relative to the view illustrated in FIG. 4A, while

DETAILED DESCRIPTION

In general, waveguides (e.g., optical dielectric or photonic crystal waveguides) of the present invention include air-gap cladding layers. The presence of air-gap cladding layers allows for a maximization in refractive index contrast between the waveguide core and cladding layer regions, which in turn permits tighter bends and increased waveguide density. Another feature of the waveguide of the present invention includes having a coupling element disposed within and/or adjacent to the waveguide core in order to couple optical power both into and out of waveguide core.

Waveguides of the present invention can be included in devices such as, for example, microelectronic devices that require the incorporation of optical waveguide interconnection, integrated optical devices for telecommunications switching or fiber-to-waveguide coupling applications.

Now having described waveguides in general, examples 1 and 2 will describe potential embodiments of the present invention. While embodiments of the waveguide are described in connection with examples 1 and 2 and the corresponding text and figures, there is no intent to limit embodiments of the waveguide to these descriptions. On the contrary, the intent is to cover all alternatives, modifications, and equivalents included within the spirit and scope of embodiments of the present invention.

EXAMPLE 1

Figure 1A:
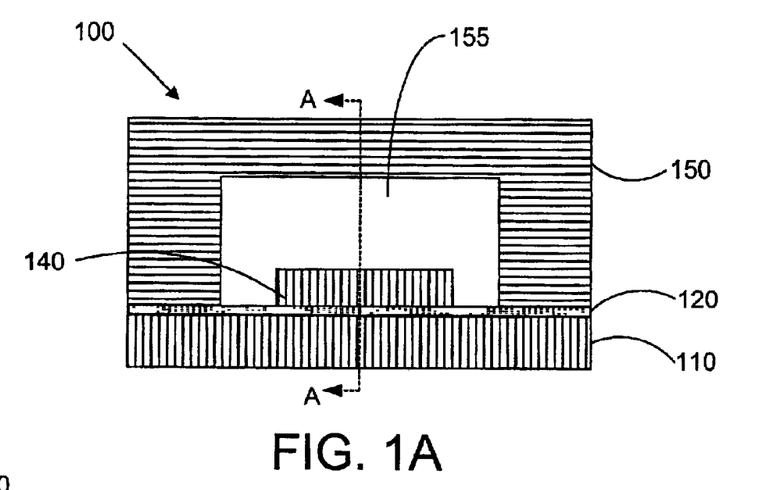
Figure 1B:
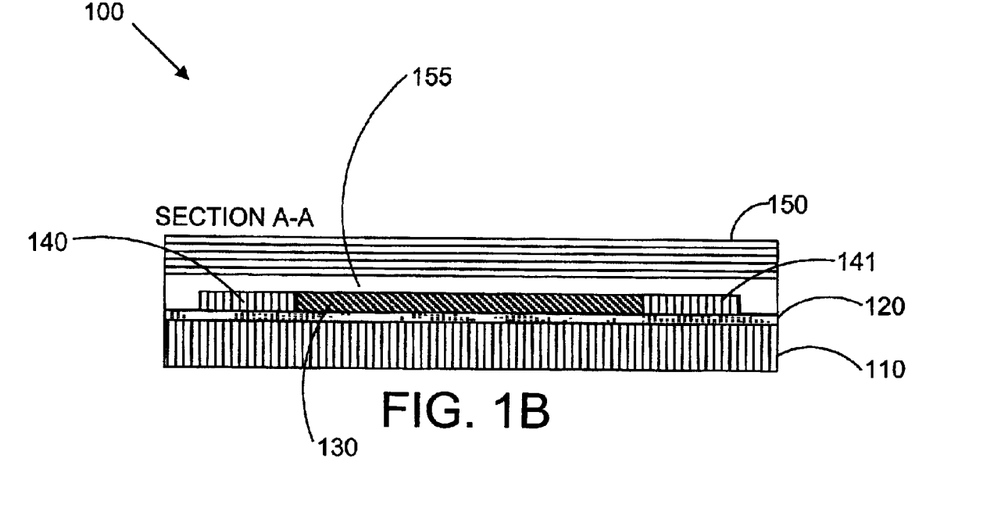
FIG. 1B is a cross-sectional view of FIG. 1A in the A—A direction, as shown by the arrows in FIG. 1A.

FIGS. 1A and 1B are schematics that illustrate two cross-sectional views of waveguide 100 having an air-gap cladding layer 155. FIG. 1B is a cross-sectional view of FIG. 1A in the A—A direction, as shown by the arrows in FIG. 1A.

Waveguide 100 includes a substrate 110, a lower cladding layer 120, the air-gap cladding layer 155, and an overcoat layer 150. The lower cladding layer 120 is disposed on the substrate 110, while the waveguide core 130 is disposed on the lower cladding layer 120. The overcoat layer 150 is disposed over the air-gap cladding layer 155 and the lower cladding layer 120. Additional details regarding the spatial relationship of the components of waveguide 100, depicted in FIGS. 1A and 1B, are discussed in FIGS. 2A–2H and 3A–3H, which illustrate an exemplary fabrication process of waveguide 100.

The substrate 110 can be any of a variety of substrates that can be used to support waveguide 100. The substrate 110 can include materials such as, for example, silicon, silicon compounds, germanium, germanium compounds, gallium, gallium compounds, indium, indium compounds, or other semiconductor materials and/or compounds. In addition, the substrate 110 can include non-semiconductor substrate materials, including any dielectric material similar to, or the same as, those employed for the waveguide materials, metals such as copper or aluminum, or ceramics or organic materials found in printed wiring boards, for example.

Waveguide 100 can be defined through multiple fabrication processes such as, but not limited to, photo-definition, wet chemical etching, thermally-induced refractive index gradients, and ion implantation. In addition, waveguide 100 can have geometries such as, for example, a raised strip geometry, buried geometry, and rib geometry.

Waveguide 100 includes a waveguide core 130. As shown in FIGS. 1A and 1B, waveguide 100 includes coupling elements 140 and 141 disposed at each end of the waveguide core 130. In this manner, energy (e.g., light) can enter one coupling element 140, travel down the waveguide core 130, and exit another coupling element 141. Alternatively, embodiments of waveguide (not shown) may not include coupling elements 140 and 141.

The waveguide core 130 can be fabricated from materials such as, for example, polymer materials such as polynorbornene, polyimide, or epoxy, low-k dielectric materials such as silicon dioxide, silicon nitride, methylsilsesquioxane (MSQ) and Honeywell Accuspin™, or semiconductor or crystalline materials and material compounds such as lithium niobate, gallium arsenide, or aluminum gallium arsenide. A reference describing polymer materials suitable for optical waveguide applications can be found in A. R. Blythe and J. R. Vinson, *Proc. 5th International Symposium on Polymersfor Advanced Technologies*. Tokyo, Japan: pp. 601–11, August–December 2000, for example.

In the case where coupling elements are included for optical power coupling, the type of coupling elements 140 and 141 that can be used include planar (or volume) grating couplers (as shown in FIGS. 1A–1B, 2A–2H, 3A–3H, 4A–4B, 5A–5H, and 6A–6H), evanescent couplers, surface-relief grating couplers, and total internal reflection couplers, for example. More specifically, when the couplers 140 and 141 are volume grating couplers, the volume grating coupler material can be laminated or spin-coated onto the appropriate surface. In particular, laminated volume grating couplers can be formed by holographic exposure of the grating region following lamination of the grating material. Alternatively, the laminated volume grating couplers can be formed by holographic exposure prior to lamination of the grating material. Additional details regarding grating couplers can be found in U.S. Pat. No. 6,285,813, which is herein incorporated by reference. The presence of coupling elements, however, is not a requirement for this technology, as simple butt-coupling of optical power both into and out of guided wave regions can also be performed.

The grating coupler material includes, for example, polymer materials, silver halide photographic emulsions, photo-resists such as dichromated gelatin, photopolymers such as polymethyl methacrylate (PMMA) or Dupont HRF™ photopolymer films, thermoplastic materials, photochromic materials such as crystals, glasses or organic substrates, photodichroic materials, and photorefractive crystals such as lithium niobate. These materials have the characteristics of creating a refractive index modulation through a variety of mechanisms, all of which result in the creation of a phase or absorption or mixed grating. Additional information regarding grating couplers can be found in T. K. Gaylord and M. G. Moharam, *Proc. IEEE*, vol. 73, pp. 894–937, May 1985, which is incorporated herein by reference.

As depicted in FIGS. 1A–1B, waveguide 100 includes an air-gap cladding layer 155 engaging (e.g., surrounding a portion of the waveguide 100 on one or more sides) a portion of the waveguide core 130 and coupling elements 140 and 141. Typically, the air-gap cladding layer 155 extends the length of the waveguide core 130. The air-gap cladding layer 155 has a lower index of refraction (e.g., index of refraction of 1) than the waveguide core 130.

The air-gap cladding layer 155 can be formed by the removal (e.g., decomposition) of a sacrificial layer (as shown in FIGS. 2A–2H and 3A–3H and depicted as sacrificial layer 145) from the area in which the air-gap cladding layer 155 is to be located, as illustrated in FIGS. 1A and 1B. The air-gap cladding layer 155 occupies a space bounded by the lower cladding layer 120, the waveguide core 130, the coupling elements 140 and 141, and the overcoat layer 150.

Generally, during the fabrication process of waveguide 100, a sacrificial layer (as illustrated in FIGS. 2A–2H and 3A–3H and depicted as sacrificial layer 145) is deposited onto the lower cladding layer 120, the waveguide core 130, and the coupling elements 140 and 141 and patterned. Thereafter, the overcoat layer 150 is deposited around the sacrificial layer and on the lower cladding layer 120. Subsequently, the sacrificial layer is removed forming the air-gap cladding layer 155. The processes for depositing and removing the sacrificial layer are discussed in more detail hereinafter.

The sacrificial layer can be virtually any polymer that slowly decomposes so as to not create too great of a pressure while forming the air-gap cladding layer 155. In addition, the decomposition of the sacrificial layer produces gas molecules small enough to permeate the overcoat layer 150. Further, the sacrificial layer has a decomposition temperature less than the decomposition or degradation temperature of the overcoat layer 150.

Examples of the sacrificial layer include compounds such as polynorbornenes, polycarbonates, polyethers, and polyesters. More specifically the sacrificial layer includes compounds such as BF Goodrich Unity™400, polypropylene carbonate, polyethylene carbonate, and polynorborene carbonate. The sacrificial layer may also contain photosensitive compounds, which are additives for patterning or decomposition.

The sacrificial layer can be deposited using techniques such as, for example, spin coating, doctor-blading, sputtering, lamination, screen or stencil-printing, melt dispensing, chemical vapor deposition (CVD), and plasma based deposition systems.

The height of the air-gap cladding layer 155 can range from about 0.5 to about 300 micrometers, and preferably in the range of about 1 to about 15 micrometers. The radius of the air-gap cladding layer 155 can range from about 1 to about 300 micrometers, and more particularly can range from about 50 to about 250 micrometers. In general, the height of the air-gap cladding layer 155 is controlled by both the weight fraction of the sacrificial polymer in solution as well as the deposition technique.

The sacrificial layer can be removed, for example, by thermal decomposition, ultra violet irradiation, or through direct patterning during application (i.e., screen-printing or selective etching). The thermal decomposition of the sacrificial layer can be performed by heating the waveguide 100 to the decomposition temperature of the sacrificial layer and holding at that temperature for a certain time period (e.g., 1–4 hours). Thereafter, the decomposition products diffuse through the overcoat layer 150 leaving a virtually residue-free hollow structure (air-gap cladding layer 155).

Waveguide 100 also includes a lower cladding layer 120. The lower cladding layer can be any material that has a lower index of refraction than the waveguide core 130, and these may include, for example, the same or similar materials as those employed for the waveguide core region 130. Alternatively, the substrate 110 can act as the lower cladding of the waveguide 100.

The overcoat layer 150 can be any modular polymer that includes the characteristic of being permeable or semi-permeable to the decomposition gases produced by the decomposition of the sacrificial layer while forming the air-gap cladding layer 155. In addition, the overcoat layer 150 has elastic properties so as to not rupture or collapse under fabrication and use conditions. Further, the overcoat layer 150 is stable in the temperature range in which the sacrificial layer decomposes.

Examples of the overcoat layer 150 include compounds such as, for example, polyimides, polynorbornenes, epoxides, polyarylenes ethers, and parylenes. More specifically, in preferred embodiments, the overcoat layer 150 is a compound such as Amoco Ultradel™7501, BF Goodrich Avatrel™Dielectric Polymer, DuPon™2611, DuPontυ2734, DuPont™2771, or DuPont™2555.

The overcoat layer 150 can be deposited using any suitable technique such as, for example, spin coating, doctor-blading, sputtering, lamination, screen or stencil-printing, chemical vapor deposition (CVD), or through plasma based deposition systems.

Although only one waveguide core 130 is depicted in FIGS. 1A and 1B, one or more waveguide cores 130 can be included in waveguide 100. In addition, one or more waveguide cores/couplers can be included in the air-gap cladding layer 155. In addition, multiple levels of waveguides can be built atop one another in a manner analogous to back-end-of-line metallization within silicon CMOS semiconductor chips.

For the purposes of illustration only, and without limitation, waveguide 100 of the present invention is described with particular reference to the below-described fabrication method. For clarity, some portions of the fabrication process are not included in FIGS. 2A–2H and 3A–3H. For example, photolithography or similar techniques can be used to define the overcoat layer 150, the sacrificial layer, and/or the waveguide core 130 pattern. In this regard, the pattern can be defined by depositing material onto the surface of the substrate 110 and/or the lower cladding layer 120 using techniques such as, for example, sputtering, chemical vapor deposition (CVD), plasma based deposition systems, evaporation, electron-beam systems. Furthermore, the pattern can then be removed using reactive ion etching techniques (RIE), for example.

The following fabrication process is not intended to be an exhaustive list that includes all steps required for fabricating waveguide 100. In addition, the fabrication process is flexible because the process steps may be performed in a different order than the order illustrated in FIGS. 2A–2H and 3A–3H.

FIGS. 2A–2H are cross-sectional views of the fabrication process relative to the view illustrated in FIG. 1A, while FIGS. 3A–3H are cross-sectional views of the fabrication process relative to the view in FIG. 1B, section A—A of FIG. 1A. Therefore, FIGS. 2A–2H and 3A–3H illustrate corresponding views in the fabrication process from different cross-sectional views. The varying views of the fabrication process shown in FIGS. 2A–2H and 3A–3H have been provided to illustrate aspects of the fabrication process that are not necessarily observable using only FIGS. 2A–2H or FIGS. 3A–3H. In this regard, FIGS. 2A and 3A, 2B and 3B, 2C and 3C, and so on, are discussed in tandem to illustrate various aspects of the representative fabrication process.

Figure 2A:
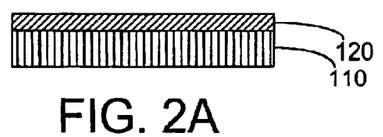
Figure 3A:
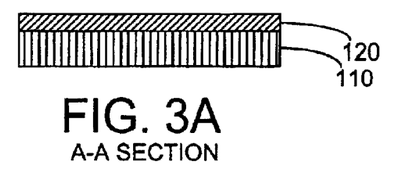
FIGS. 3A–3H are cross-sectional views of the fabrication process relative to the view in FIG. 1B, section A—A of FIG. 1A.

FIGS. 2A and 3A illustrate the lower cladding layer 120 disposed on the substrate 110.

Figure 2B:
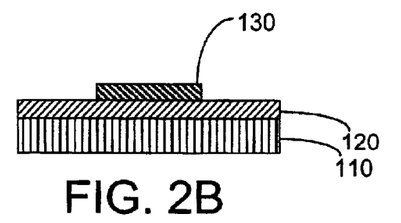
Figure 3B:
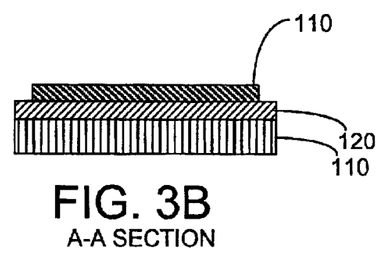

FIGS. 2B and 3B illustrate the waveguide core 130 disposed on a portion of the lower cladding layer 120 after having been etched and photo-defined.

Figure 2C:
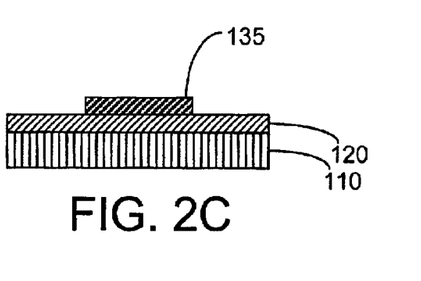
Figure 3C:
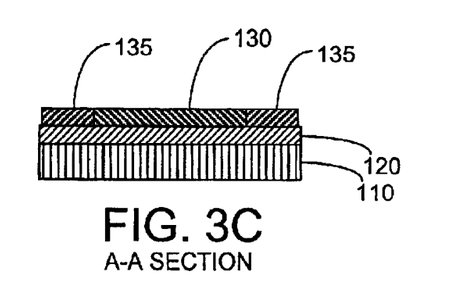

FIGS. 2C and 3C illustrate a portion of the waveguide core 130 that has been removed and replaced with the grating material 135.

Figure 2D:
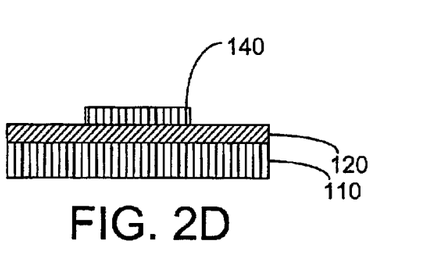
Figure 3D:
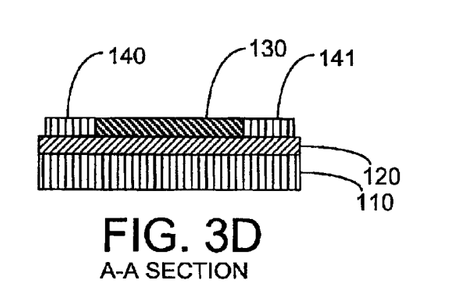

FIGS. 2D and 3D illustrate the defining of the grating material 135 into grating couplers 140 and 141. In an alternate embodiment, the waveguide core 130 and grating material 135 are the same material, in which case no material is removed, and the grating couplers 140 and 141 are defined only within the labeled areas.

Figure 2E:
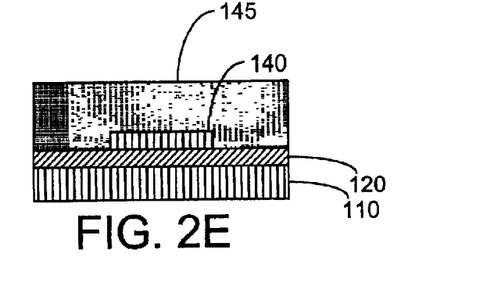
Figure 3E:
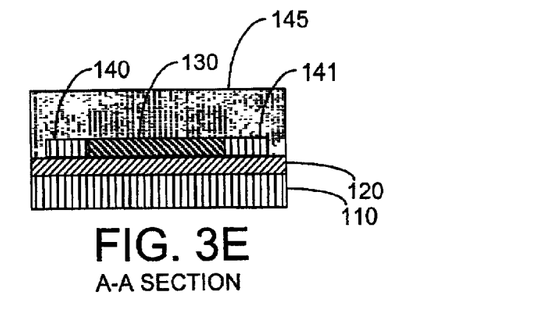

FIGS. 2E and 3E illustrate the sacrificial layer 145 disposed over the lower cladding layer 120, the waveguide core 130, and the grating couplers 140 and 141.

Figure 2F:
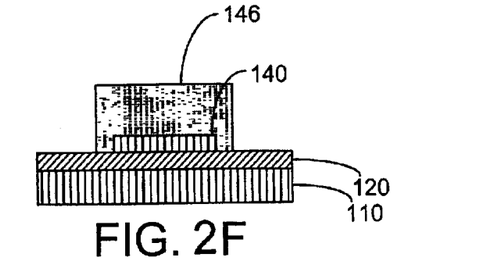
Figure 3F:
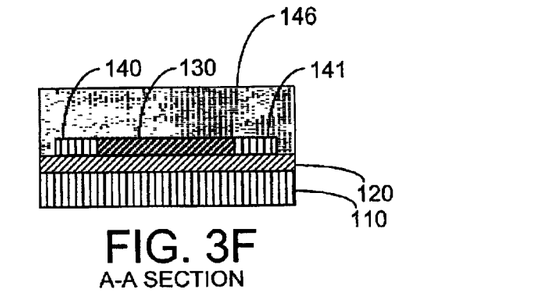

FIGS. 2F and 3F illustrate the formation of sacrificial layer section 146 by etching or UV exposure/thermal decomposition, for example, of the sacrificial layer 145. The sacrificial layer section 146 defines the area where the air-gap cladding layer 155 will subsequently be located once the sacrificial layer section 146 is removed.

Figure 2G:
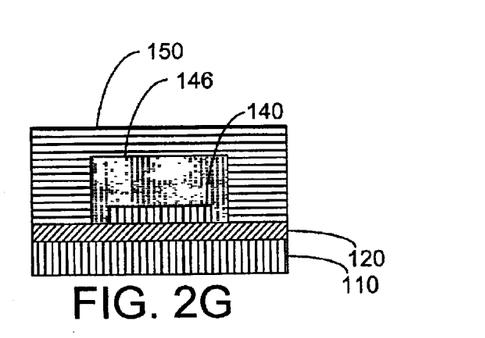
Figure 3G:
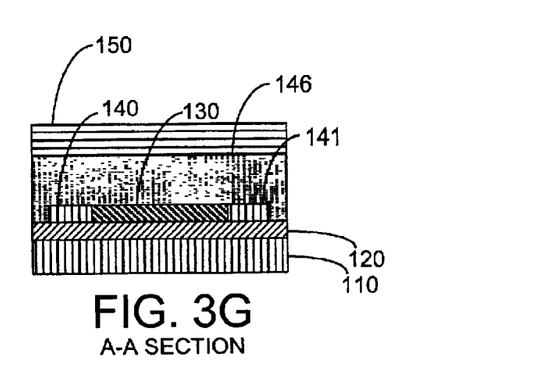

FIGS. 2G and 3G illustrate the overcoat layer 150 disposed on the lower cladding layer 120 and the sacrificial layer section 146.

Figure 2H:
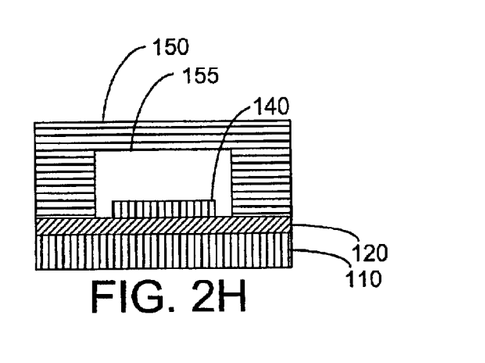
Figure 3H:
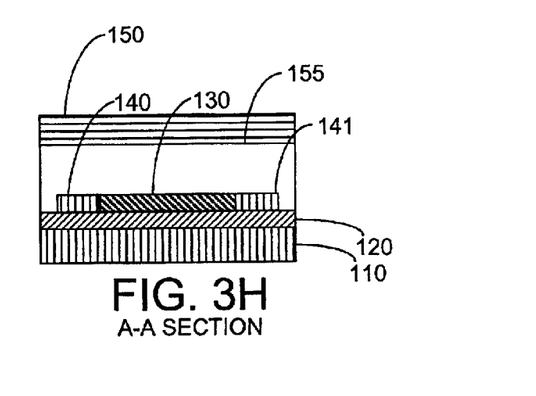

FIGS. 2H and 3H illustrate the removal of the sacrificial layer section 146 to form the air-gap cladding layer 155.

EXAMPLE 2

Figure 4A:
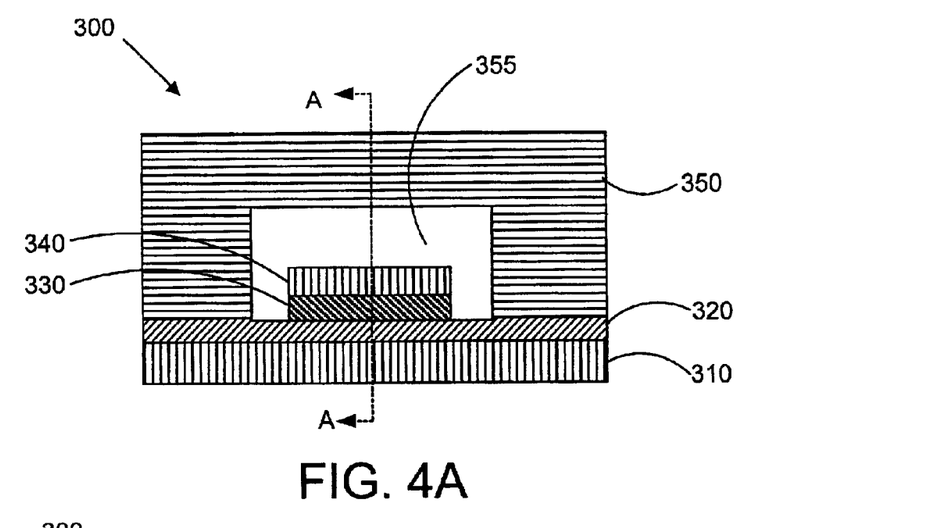
Figure 4B:
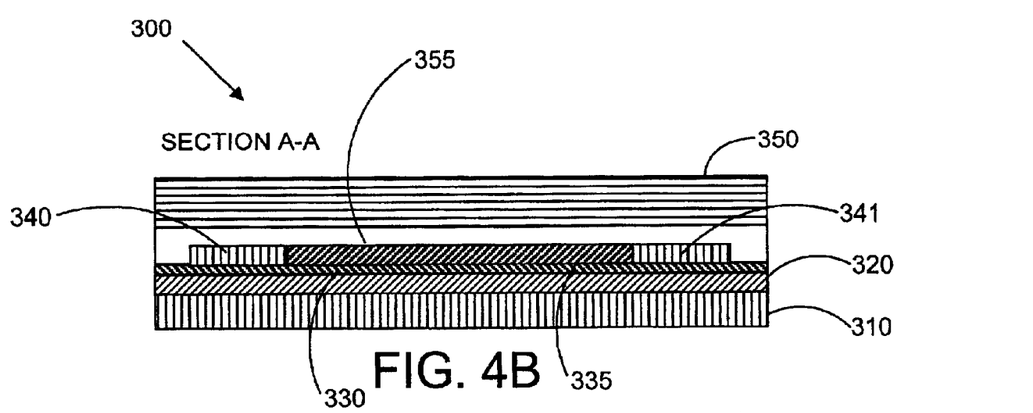
FIG. 4B is a cross-sectional view of FIG. 4A in the A—A direction, as shown by the arrows in FIG. 4A.

FIGS. 4A and 4B are schematics that illustrate two cross-sectional views of waveguide 300 having surface-mounted couplers 340 and 341. FIG. 4B is cross-sectional view of FIG. 4A in the A—A direction, as shown by the arrows in FIG. 4A.

Waveguide 300 includes a substrate 310, a lower cladding layer 320, surface-mounted couplers 340 and 341, an air-gap cladding layer 355, and an overcoat layer 350. The lower cladding layer 320 is disposed on the substrate 310. The overcoat layer 350 is disposed over the waveguide core 330 and the surface-mounted couplers 340 and 341. Additional details regarding the spatial relationship of the components of the waveguide 300 depicted in FIGS. 4A and 4B are discussed in FIGS. 5A–5H and 6A–6H.

The substrate 310, the lower cladding layer 320, the overcoat layer 350, and the air-gap cladding layer 355, discussed in relation to FIGS. 4A–4B, are analogous or similar to the substrate 110, the lower cladding layer 120, the overcoat layer 150, and the air-gap cladding layer 155, discussed in reference to FIGS. 1A and 1B, 2A–2H, and 3A–3H above. Therefore, additional discussion of these components will not be presented in relation to waveguide 300. The reader is directed to the discussion presented above for further explanation of these components.

Waveguide 300 includes a waveguide core 330, a grating coupler layer 335, and couplers 340 and 341. In this embodiment the couplers 340 and 341 are located above the waveguide core 330 in a surface-mount fashion. The couplers 340 and 341 can be fabricated in the same or similar manner as the couplers 140 and 141 discussed in relation to FIGS. 1A and 1B. Surface-mounted couplers operate based on evanescent interaction between the grating coupler layer 335 and waveguide core layer 330.

For the purposes of illustration only, and without limitation, waveguide 300 of the present invention is described with particular reference to the below-described fabrication method. For clarity, some portions of the fabrication process are not included in FIGS. 5A–5H and 6A–6H. For example, photolithography or similar techniques can be used to define the overcoat layer 350, the sacrificial layer, and/or waveguide core 330 pattern. In this regard, the pattern can be defined by depositing material onto the surface of the substrate 310 and/or the lower cladding layer 320 using techniques such as, for example, sputtering, chemical vapor deposition (CVD), plasma based deposition systems, evaporation, electron-beam systems. Furthermore, the pattern can then be removed using reactive ion etching techniques (RIE), for example.

The following fabrication processes are not intended to be an exhaustive list that includes every step required for fabricating waveguide 300. In addition, the fabrication process is flexible because the process steps can be performed in a different order than the order illustrated in FIGS. 5A–5H and 6A–6H.

FIGS. 5A–5H are cross-sectional views of the fabrication process relative to the view illustrated in FIG. 4A, while FIGS. 6A–6H are cross-sectional views of the fabrication process relative to the view in FIG. 4B, section A—A of FIG. 4A. Therefore, FIGS. 5A–5H and 6A–6H illustrate corresponding views in the fabrication process from different cross-sectional views. The varying views of the fabrication process shown in FIGS. 5A–5H and 6A–6H have been provided to illustrate aspects of the fabrication process that are not necessarily observable using only FIGS. 5A–5H and 6A–6H. In this regard, FIGS. 5A and 6A, 5B and 6B, 5C and 6C, and so on, are discussed in tandem to illustrate various aspects of the fabrication process.

Figure 5A:
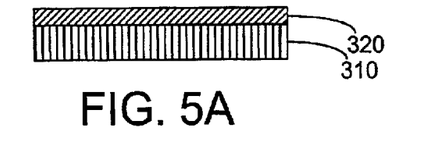
Figure 6A:
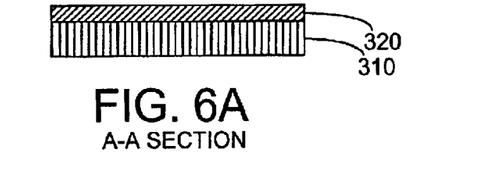
FIGS. 6A–6H are cross-sectional views of the fabrication process relative to the view in FIG. 4B, section A—A of FIG. 4A.

FIGS. 5A and 6A illustrate the lower cladding layer 320 disposed on the substrate 310.

Figure 5B:
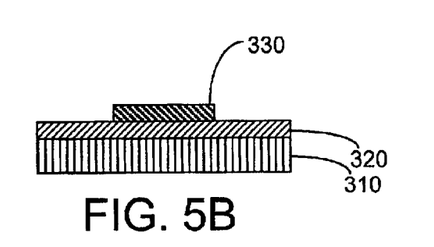
Figure 6B:
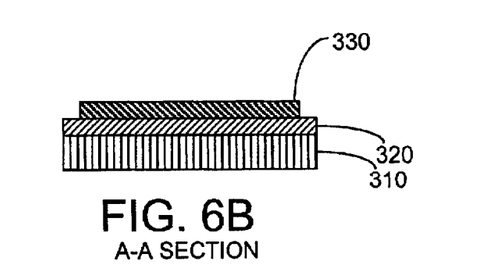

FIGS. 5B and 6B illustrate the waveguide core 330 disposed on a portion of the lower cladding layer 320 after having been etched and photo-defined.

Figure 5C:
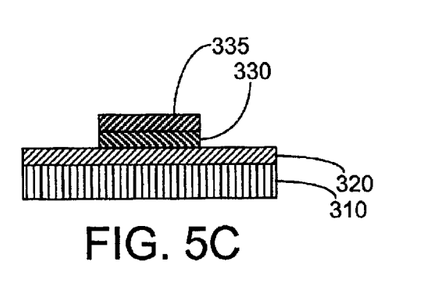
Figure 6C:
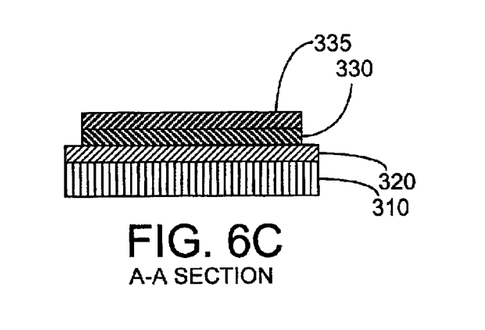

FIGS. 5C and 6C illustrate the coupler material 335 deposited on the waveguide core 330.

Figure 5D:
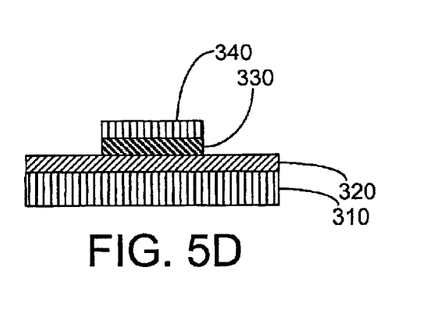
Figure 6D:
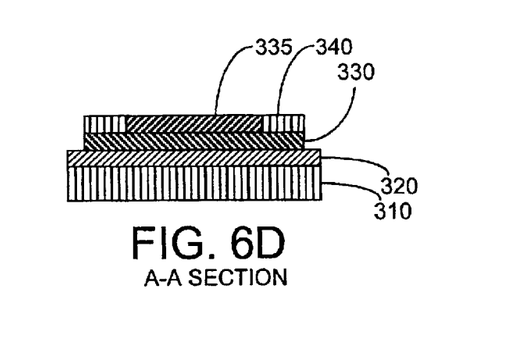

FIGS. 5D and 6D illustrate the defining and forming of the grating material 335 into grating couplers 340 and 341.

Figure 5E:
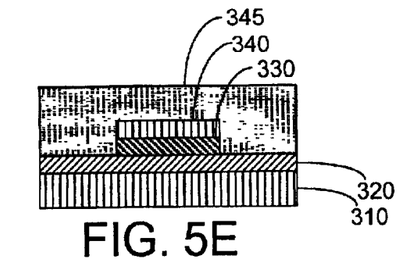
Figure 6E:
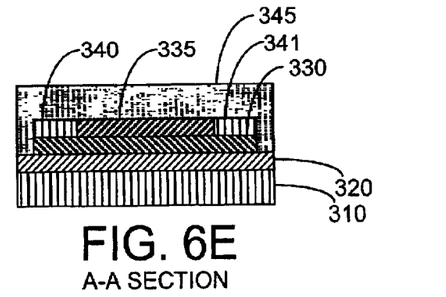

FIGS. 5E and 6E illustrate the sacrificial layer 345 deposited over the lower cladding layer 320, the waveguide core 330, the grating layer 335, and the grating couplers 340 and 341.

Figure 5F:
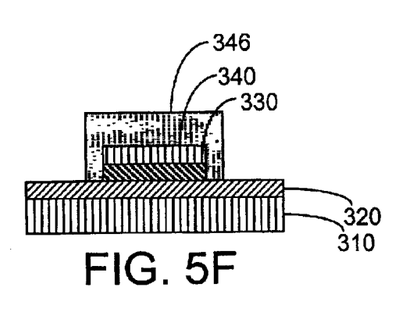
Figure 6F:
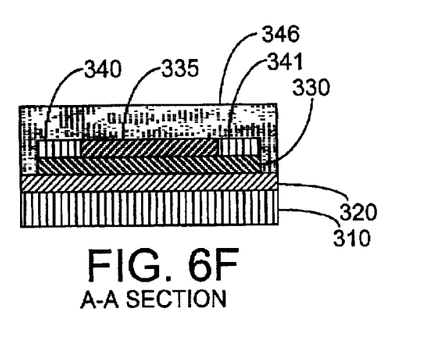

FIGS. 5F and 6F illustrate the formation of the sacrificial layer section 346, which defines the area where the air-gap cladding layer 355 will subsequently be located once the sacrificial layer section 346 is removed.

Figures 5G, 5H:
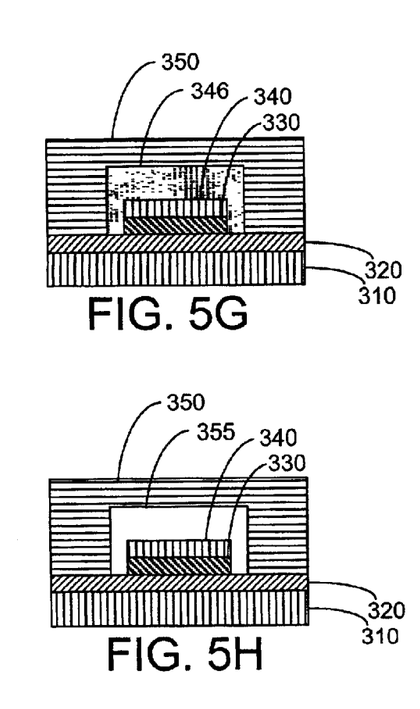
Figure 6G:
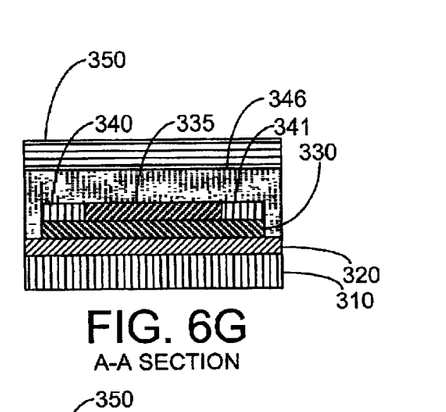

FIGS. 5G and 6G illustrate the formation of the overcoat layer 350 on the lower cladding layer 320 and first sacrificial layer section 346.

Figure 6H:
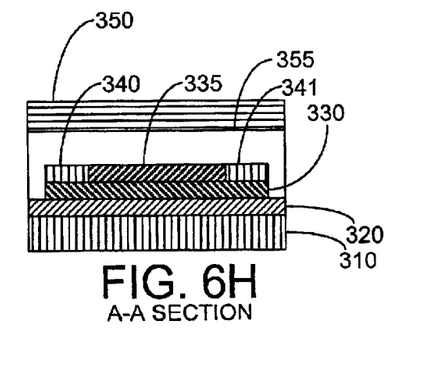

FIGS. 5H and 6H illustrate the removal of the sacrificial layer section 346 to form the air-gap cladding layer 355.

It should be emphasized that the above-described embodiments of the present invention are merely possible examples of implementations, and are set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A monolithic waveguide comprising:
   a planar waveguide core disposed in a fixed position and flush with a lower cladding;
   an air-gap cladding engaging a portion of the waveguide core; and
   an overcoat layer engaging a portion of the air-gap cladding and engaging the lower cladding.

2. The waveguide of claim 1, wherein the waveguide core includes at least one coupling element, wherein the air-gap cladding engages a portion of the at least one coupling element.

3. The waveguide of claim 1, further comprising:
   at least one coupling element disposed adjacent to the waveguide core.

4. The waveguide of claim 1, further comprising:
   a second waveguide cladding adjacent to the waveguide core, wherein the air-gap cladding engages a portion of the second waveguide cladding.

5. The waveguide of claim 1, further comprising:
   a second waveguide core, wherein the air-gap cladding engages a portion of the second waveguide core.

6. The waveguide of claim 1, wherein the overcoat layer is selected from silicon dioxide, silicon nitride, polyimides, polynorbornenes, epoxides, polyarylenes ethers, and parylenes.

7. The waveguide of claim 1, wherein the overcoat layer is selected from polyimides, polynorbomenes, epoxides, polyarylenes ethers, and parylenes.

8. The waveguide of claim 1, wherein the overcoat layer is selected from polyimides and polynorbornenes.

9. A device, comprising:
   a monolithic waveguide having a planar waveguide core disposed in a fixed position and flush with a lower cladding, an air-gap cladding engaging a portion of waveguide core, and an overcoat layer engaging a portion of the air-gap cladding, wherein the overcoat layer engages the lower cladding.

10. The device of claim 9, wherein the waveguide is included in a microelectronic device.

11. The device of claim 9, wherein the waveguide is included in an integrated optical device.

12. The device of claim 9, wherein the waveguide is included in a photonic crystal device.

13. The device of claim 9, wherein the overcoat layer is selected from silicon dioxide, silicon nitride, polyimides, polynorbornenes, epoxides, polyarylenes ethers, and parylenes.

14. The device of claim 9, wherein the overcoat layer is selected from polyimides, polynorbornenes, epoxides, polyarylenes ethers, and parylenes.

15. The device of claim 9, wherein the overcoat layer is selected from polyimides and polynorbornenes.

* * * * *